United States Patent
Galik

(10) Patent No.: US 6,440,054 B1
(45) Date of Patent: Aug. 27, 2002

(54) APPARATUS FOR LIQUID-LIQUID EXTRACTION

(76) Inventor: George M. Galik, 3236 Falcon Ridge Rd., Diamond Bar, CA (US) 91765-3819

(*) Notice: Subject to any disclaimer, the term of this patent is extended or adjusted under 35 U.S.C. 154(b) by 0 days.

(21) Appl. No.: 09/664,277

(22) Filed: Sep. 18, 2000

(51) Int. Cl.[7] .............................. B04B 1/04; B04B 5/06; B04B 11/00
(52) U.S. Cl. .............................. 494/22; 494/56; 494/65; 494/67; 494/74
(58) Field of Search .............................. 494/22, 43, 56, 494/42, 65, 67, 74, 79, 83, 901

(56) References Cited

U.S. PATENT DOCUMENTS

| | | | |
|---|---|---|---|
| 2,044,996 A | | 6/1936 | Podbielniak |
| 2,281,796 A | | 5/1942 | Podbielniak |
| 2,563,550 A | * | 8/1951 | Quist |
| 2,819,014 A | * | 1/1958 | Zabriskie, Jr. |
| 2,819,015 A | * | 1/1958 | Vaughan |
| 3,233,880 A | | 2/1966 | Podbielniak |
| 3,332,614 A | * | 7/1967 | Webster et al. |
| 3,674,196 A | * | 7/1972 | Gutter |
| 3,756,505 A | * | 9/1973 | Miachon |
| 3,791,575 A | * | 2/1974 | Kartinen et al. |
| 3,814,307 A | * | 6/1974 | Hengstebeck |
| 3,960,319 A | * | 6/1976 | Brown et al. |
| 3,998,610 A | * | 12/1976 | Leith |
| 4,010,891 A | * | 3/1977 | Kartinen |
| 4,595,571 A | | 6/1986 | Galik |
| 4,657,401 A | | 4/1987 | Galik |
| 4,678,545 A | | 7/1987 | Galik |
| 4,786,480 A | * | 11/1988 | Martin |
| 4,824,430 A | * | 4/1989 | Kashihara et al. |
| 4,846,780 A | * | 7/1989 | Galloway et al. |
| 4,857,040 A | * | 8/1989 | Kashihara et al. |
| 4,925,441 A | * | 5/1990 | Jubin |
| 4,959,158 A | | 9/1990 | Meikrantz |
| 4,995,916 A | | 2/1991 | Meikrantz et al. |
| 5,024,647 A | * | 6/1991 | Jubin et al. |

(List continued on next page.)

OTHER PUBLICATIONS

Godfrey et al., "Studies of Entrainment in Mixer Settlers", Schools of Chemical Engineering, University of Bradford, Bradford BD7 1DP, West Yorkshire, England, ©The American Institute of Chemical Engineers, 1978.

B&P Centrifugal Products, "Flexible Solutions for Today's Process Industries", B&P Process Equipment and Systems, LLC, 1000 Hess Ave., Saginaw, MI 48601, brochure.

CINC, "Liquid–Liquid Centrifugal Separators", 3535 Arrowhead Drive, Carson City, Nevada 89706, brochure.

CINC, "Liquid Processing Solutions", 3535 Arrowhead Drive, Carson City, Nevada 89706, brochure.

Robatel, Inc., "Centrifugation product lines", 703 West Housatonic St., Pittsfield, MA 01201, brochure.

*Primary Examiner*—Charles E. Cooley
(74) *Attorney, Agent, or Firm*—Christie, Parker & Hale, LLP

(57) ABSTRACT

Liquid—liquid extraction apparatus includes a separator tank rotatable about an axis extending through the tank, a tank inlet for a mixture of two liquids of different densities and which are substantially insoluble in each other, a tank outlet on the axis of rotation for the light liquid, and a tank outlet spaced from the axis of rotation for the heavy liquid. In terms of method, a mixture of the two liquids is rotated about an axis extending through the mixture to cause the light liquid to concentrate at the axis of rotation, and to cause the heavy liquid to concentrate at the periphery of the rotating liquid. The light liquid is removed from the body of liquid along a flow path co-linear with the axis, and the heavy liquid is removed from the periphery of the rotating body of liquid.

6 Claims, 2 Drawing Sheets

U.S. PATENT DOCUMENTS

| | | | |
|---|---|---|---|
| 5,080,693 A | | 1/1992 | Bourne et al. |
| 5,254,075 A | * | 10/1993 | Nemoto et al. |
| 5,254,076 A | * | 10/1993 | Chow et al. |
| 5,267,936 A | * | 12/1993 | Miachon |
| 5,466,375 A | | 11/1995 | Galik |
| 5,484,383 A | * | 1/1996 | Fitch, Jr. et al. |
| 5,571,070 A | | 11/1996 | Meikrantz et al. |
| 5,591,340 A | * | 1/1997 | Meikrantz et al. |
| 5,624,371 A | * | 4/1997 | Mohn |
| 5,762,800 A | | 6/1998 | Meikrantz et al. |
| 5,908,376 A | | 6/1999 | Macaluso et al. |
| 6,036,630 A | | 3/2000 | Robey |
| 6,102,843 A | * | 8/2000 | Kelley et al. |
| 6,203,483 B1 | * | 3/2001 | Birdwell et al. |
| 6,238,329 B1 | * | 5/2001 | Rogers |
| 6,290,636 B1 | * | 9/2001 | Hiller, Jr. et al. |

* cited by examiner

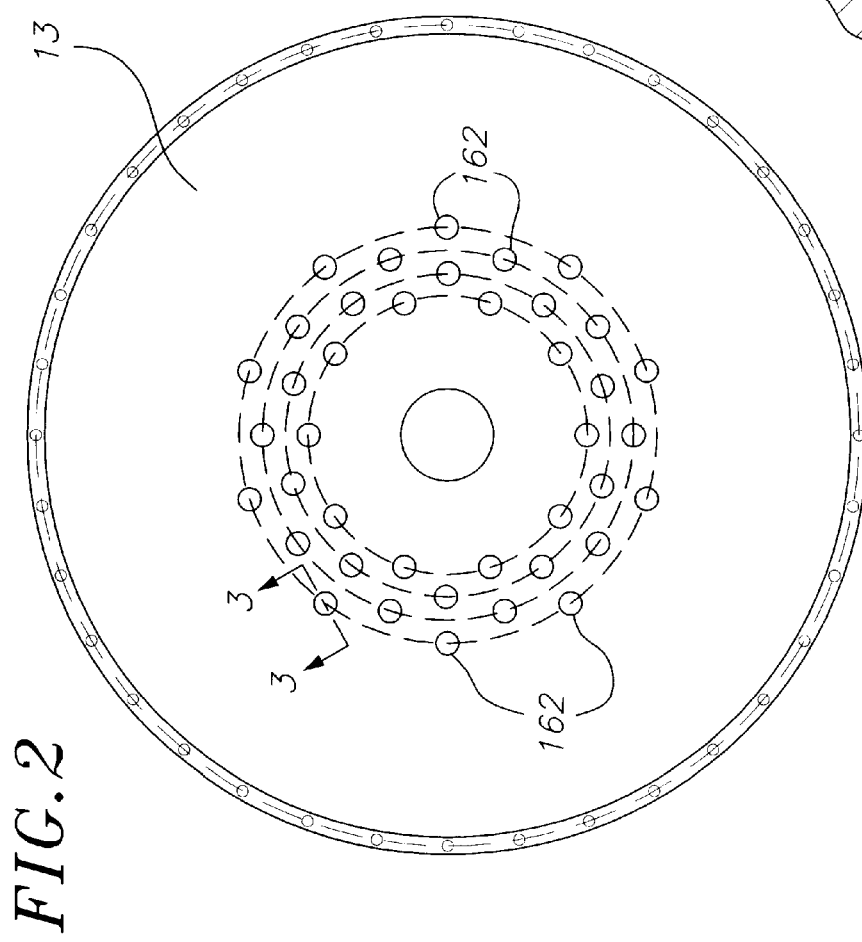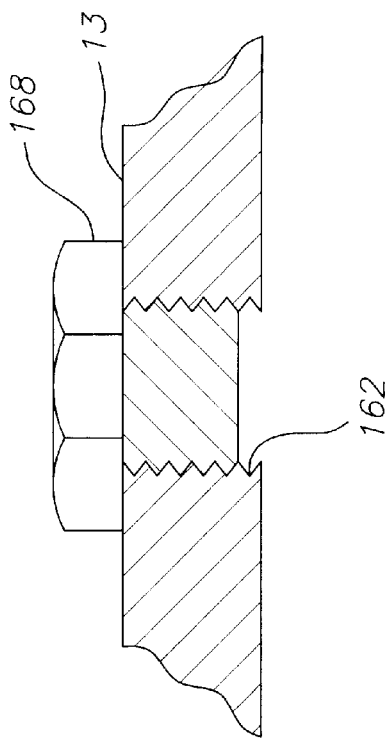

APPARATUS FOR LIQUID-LIQUID EXTRACTION

THE INVENTION

This invention relates to methods and apparatus for liquid-liquid extraction.

BACKGROUND OF THE INVENTION

Liquid-liquid extraction has been used for many years to transfer material dissolved in one liquid to another liquid. The two liquids are of different densities, and are substantially mutually insoluble so they can be intimately mixed to effect efficient transfer of the desired material from one liquid to the other. After the transfer is made, the two liquids are separated by gravity or centrifugal action.

In one application of liquid-liquid extraction, a material which is soluble in organic solvents is removed (extracted) from an aqueous solution by intimately contacting the aqueous phase with a suitable water-insoluble organic liquid as the extractant, followed by phase separation. Similarly, acidic or basic components of an organic solution can be removed by contacting it with an alkaline or acidic aqueous solution, as appropriate.

In another use of liquid-liquid extraction, an aqueous solution containing an ionic material (such as dissolved copper) is contacted with a liquid "ion exchange material", which forms all or part of an organic liquid that is substantially immiscible with the aqueous solution. The ionic material combines with the ion exchange material (ion exchanger), forming a compound that is soluble in the organic liquid and substantially insoluble in the aqueous phase. An example of a liquid ion exchanger is a hydroxy oxime ion exchanger, which is useful to extract ionic copper dissolved in acidic or basic aqueous solutions. A hydroxy oxime ion exchanger is sold under the trademark "LIX 64 N" by Henkel Corporation, 1844 West Grant Road, Tucson, Ariz.

With various extractants available today, it is possible to isolate many different soluble materials in a concentrated and pure form from an initially complex dilute solution of the material.

A problem with all liquid-liquid extraction is achieving rapid and efficient separation of the two mixed liquids. Conventional settlers relying on gravity alone must be large to allow adequate residence time to achieve desired separation, and therefore must be large, which requires a lot of space, and expensive construction. Centrifugal separators have been used to accelerate the separation of the two liquids. However, centrifugal equipment available before this invention is expensive, and thus is limited to applications where the recovered material has an inordinately high value, such as pharmaceuticals. In addition, a serious problem with prior art centrifuges is that they permit the formation of an air or vapor phase, which aggravates the problem of entrainment of one liquid in the other, thereby reducing separator efficiency.

Although continuous throughput centrifugal separators have been available for more than 60 years (for example, see U.S. Pat. No. 2,044,996 issued in 1936 to Podbielniak), the industry still needs a cost-effective continuous centrifuge, which rapidly and efficiently separates the mixture into two phases, and with minimum entrainment of one liquid phase in the other.

SUMMARY OF THE INVENTION

This invention provides a low cost, effective centrifugal separator for two liquids which are of different densities and are substantially mutually insoluble. In the preferred form of the invention, an efficient mixer section is provided at the inlet end of the centrifugal separator. The mixer section provides such intimate contact between the two liquids that the same material transfer that takes up to two minutes in conventional mixers can take place in less than 10 seconds because of the intimate contact followed by fast separation of the two mixed liquids in the centrifugal separator.

In brief, the apparatus of this invention for separating a mixture of two liquids of different densities and which are substantially insoluble in each other includes a separator tank rotatable about an axis extending through the tank. The tank includes an inlet for the two mixed liquids. The tank also includes an outlet on the axis of rotation for the light liquid, and an outlet spaced from the axis of rotation for the heavy liquid. Thus, as the tank rotates, the heavy liquid is driven outwardly, forcing the light liquid inwardly to the axis of rotation, where the light liquid is removed. Preferably, the tank is secured to and rotates with a drive shaft having a longitudinally extending hollow section collinear with the axis of rotation. One or more radially extending ports through the wall of the shaft permit the light liquid to flow into the hollow section of the shaft and out of the tank. Thus, there is no opportunity for an air column or a vapor phase to form around the axis of rotation. This ensures that all the volume available in the tank for the light liquid is fully utilized, and that no air or vapor is entrained in the liquid.

Preferably, the tank is in the shape of a vertical right cylinder having an annular inlet end wall, an annular outlet end wall, and a cylindrical sidewall. The drive shaft extends through the tank and the two annular end walls along an axis collinear with an axis parallel to the cylindrical sidewall of the tank, and located in the center of the tank. The shaft is secured to the inner periphery of the annular inlet end wall. The inlet for the two mixed liquids is at the outlet end wall of the tank, and the outlets for the two separated liquids are at the outlet end wall of the tank. Preferably, the two mixed liquids enter the tank in the vicinity of the axis of rotation. An annular outlet or deflection baffle in the tank is secured around its inner periphery to the drive shaft adjacent the outlet end wall of the tank between the outlet end wall of the tank and the inlet ports in the shaft for the light liquid. The outside diameter of the annular baffle is slightly less than the inside diameter of the tank. This forces the heavy liquid to travel outwardly, around the outer edge of the annular outlet baffle, and through an annular space between the baffle outer periphery and the inner surface of the tank side wall. A plurality of outlet ports for the heavy liquid extend through the outlet end of the tank wall at various distances from the axis of rotation. The heavy liquid outlet ports can be opened or closed with removable plugs to set the position of the interface or "neutral zone" between the two liquids in the tank. Heavy liquid flows from the top of the outlet end of the rotating tank down into an annular space between the tank and a stationary housing around the tank, and is removed for further processing or storage.

In the preferred form of the invention, the drive shaft is supported in a vertical position by a thrust bearing at the upper end of the shaft. The bearing is supported by an upright rectangular frame, which surrounds and also supports the stationary housing disposed around the rotatable tank. Preferably the stationary housing is cylindrical, and coaxially disposed around the rotatable tank. The upper end of the drive shaft is connected to a hydraulic or an electric motor mounted on the frame. The motor rotates the shaft and tank at the desired operating speed. In one form of the invention, the shaft extends from the motor down through a pair of longitudinally spaced rotatable seals at the upper and lower ends, respectively, of a light liquid collector, which is mounted on the top of the housing, and surrounds the drive shaft. A series of light liquid outlet ports extending through the wall of the hollow section of the shaft permit light liquid to flow into the light liquid collector for further processing or to storage.

The lower end of the drive shaft extends coaxially down through a vertical inlet tube secured to the inner periphery of the annular outlet end wall. The shaft is secured to the upper end of the inlet tube above the outlet end wall of the tank. A rotating seal connected to the inlet tube and the housing bottom around the central opening in the bottom of the housing permits rotation of the tank and inlet tube without loss of fluid from the housing, except through a heavy liquid outlet through the outlet end of the housing.

In the presently preferred form of the invention, a mixing unit is secured to the end of the housing adjacent the inlet wall of the tank, and mixes two incoming streams of heavy and light liquids. That mixture is fed through the inlet tube into the inlet end of the rotating tank.

In another form of the invention, the upper rotating seals can be omitted, and the light fluid from the hollow portion of the shaft is collected in a reservoir on the outlet end of the tank housing.

In terms of method, the invention separates two substantially mutually insoluble liquids of different densities from a body of liquid containing a mixture of the two liquids by rotating the body of liquid about an axis to cause the light liquid to concentrate at the axis of rotation, and to cause the heavy liquid to concentrate at the periphery of the rotating body of liquid. The light liquid is removed from the body along a flow path collinear with the axis, and the heavy liquid is removed from the periphery of the rotating body of liquid. Preferably, a mixture of the two liquids is added to the rotating body of liquid as light and heavy liquids are separately removed from the rotating body of liquid.

THE DRAWINGS

FIG. 2 is a plan view of the top of the inlet end of the rotatable tank; and

FIG. 3 is a view taken on line 3—3 of FIG. 2 showing a removable plug in one of the heavy liquid outlet ports.

DETAILED DESCRIPTION OF THE INVENTION

Figure 1:
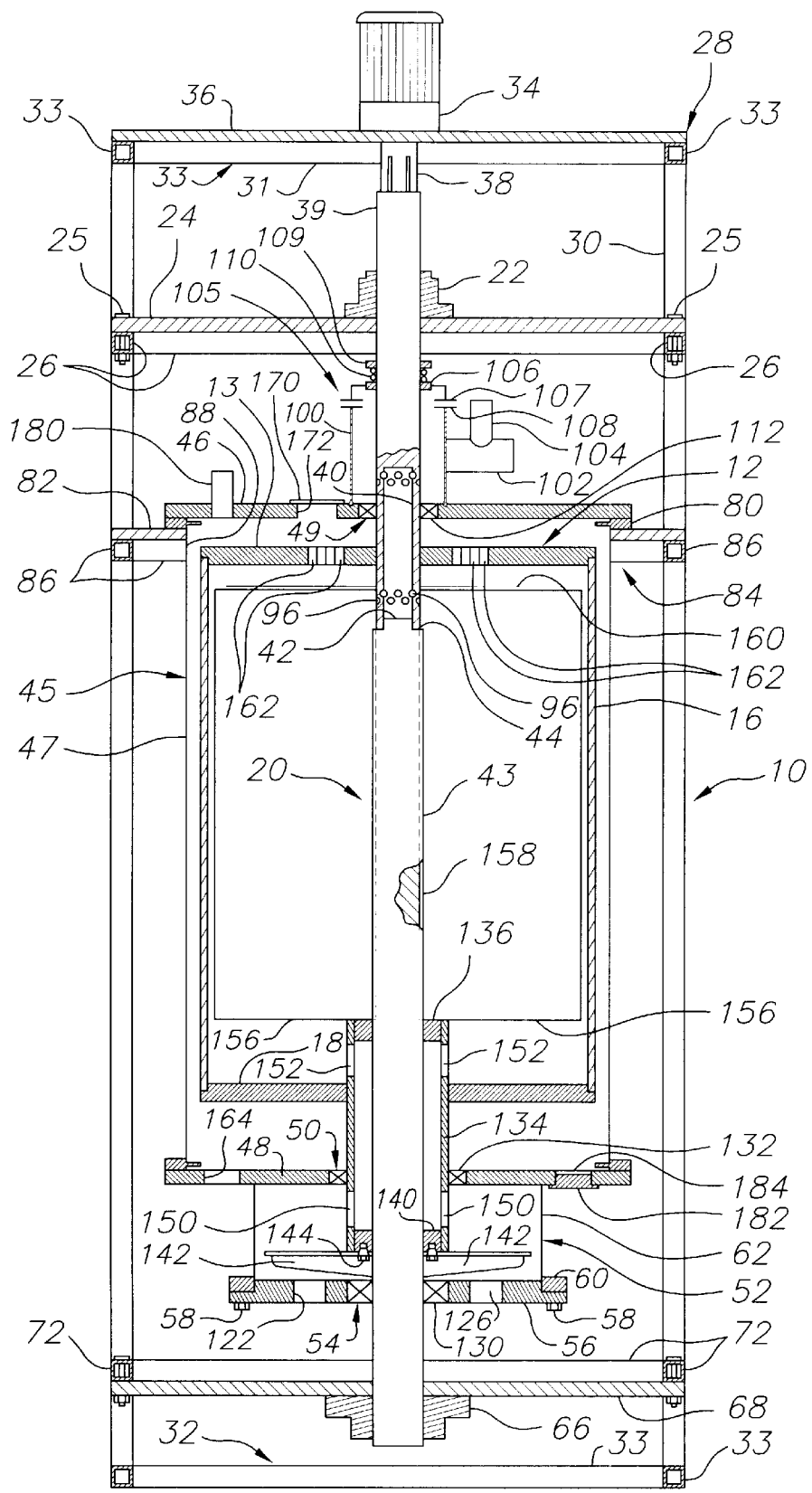
FIG. 1 is a vertical sectional view, partly broken away, of the frame, separator, and mixing unit.

Referring to FIG. 1, a combination mixer-separator 10 includes a rotatable tank 12 in the shape of a vertical right cylinder having a horizontal annular upper or outlet wall 13, a vertical cylindrical side wall 16, and a horizontal annular lower or outlet end wall 18. A vertical drive shaft 20 is suspended at its upper end by an upper thrust bearing 22 mounted on a horizontal upper support plate 24 secured by bolts 25 to the upper surfaces of four horizontal cross-members 26 in the upper part of an upright frame 28, which in plan view (not shown) is in the shape of a square. Only three of the four cross-members 26 are shown. A separate elongated vertical column 30 forms each corner of the frame. Only two of the four columns 30 are shown. An upper end set 31 and a lower end set 32 of four horizontal cross-bars 33 are welded at their respective ends to the respective upper and lower ends of columns in the frame. Only three of the four cross-bars in each set are shown. The columns 30, cross-members 26, and cross-bars 32 can be of any suitable material. I have found that 2"×2"×0.250" steel square tubing to be satisfactory.

A motor 34, which may be electric or hydraulic, is mounted on a horizontal top plate 36 secured across the upper end of the frame, and has a vertical motor shaft 38 with external splines which fit down into the upper end of an upper section 39 of the drive shaft 20. The upper end of the upper section 39 has internal splines (not shown) to mate with the external splines on the motor shaft 38.

The upper section 39 of the drive shaft extends down through and is welded to the inner periphery of the annular outlet end wall 13 of the tank. The lower end of the upper section 39 of the drive shaft includes an elongated vertical bore 40, which opens out of the lower end of section 39. An upwardly extending circular boss 42 on the upper end of a lower section 43 of the drive shaft makes a snug fit into the lower end of the bore 40. The lower end of the upper section 39 rests on an annular shoulder 44 surrounding the boss 42.

A stationary cylindrical tank housing 45 coaxially disposed around the rotatable tank includes an annular horizontal upper end wall 46 spaced slightly above the upper end wall 13 of the tank, a vertical cylindrical side wall 47, and an annular horizontal lower end wall 48 spaced below the lower wall of the tank. The outlet and inlet end walls of the stationary housing each include a separate central bore 49 and 50, respectively, down through which the drive shaft extends. The lower section 43 of the drive shaft extends down through the center of a mixing unit 52 secured to the underside of the lower end wall of the housing, and down through a vertical bore 54 in the center of a horizontal annular bottom 56 secured by bolts 58 to an outwardly extending angular flange 60 on the lower end of a cylindrical case 62 of the mixing unit 52, and down through a steady-rest bearing 66 secured to the underside of a generally rectangular bottom support plate 68 fastened by bolts 70 between adjacent columns 30 to the underside of four horizontal cross-members 72 welded at their respective ends to vertical columns 30 of the frame. Only three of the four cross-members 72 are shown. The upper end of the cylindrical case 62 of the mixing unit is welded to the underside of the lower end wall 48 of the housing. The lower section of the drive shaft is free to move longitudinally with respect to the steady-rest bearing to accommodate expansion and contraction of the apparatus in response to any changes in temperature which may occur during operation.

The housing upper end wall 48 includes an outwardly extending annular flange 80 secured by bolts (not shown) to the top of a housing support plate 82 anchored by bolts (not shown) on top of a set 84 of four horizontal cross-members 86 welded at their ends to respective column 30 of the frame 28. Only three of the four cross-members 86 are shown. The housing cylindrical side wall makes a close fit down through a circular opening 88 in the housing support plate 82.

The lower end of the upper section 39 of the drive shaft terminates in the upper part of the rotatable tank, and includes a plurality of radially extending inlet ports 96 adjacent the lower end of bore 40 so a light liquid (not shown) can flow from the tank into the bore 40 as described below. A group of radially extending outlet ports 98 through the side wall of the upper section 39 of the drive shaft at the upper end of bore 40 above the housing upper end wall 46 permit light liquid to flow outwardly from the bore 40 and into a collector sleeve 100 mounted on top of the outlet end of the tank housing coaxially around the drive shaft. The collector sleeve includes a laterally extending discharge tube 102 for light liquid to flow to storage or further processing. The lower end of a vertical vent tube 104 is connected to the lateral tube 102 to prevent pressure build up within the light liquid discharge tube 102. A first rotating seal 105 makes a static seal 106 against the drive shaft, and makes a sliding seal 107 against an annular seat 108 on the upper end of the collector sleeve. An adjustable clamp 109 secured around the shaft urges a compression spring 110 against the static seal 106 and toward the annular seal 108 to maintain liquid tight contact at sliding seal 107. The rotating seal 105 may be of any suitable commercially available type, such as a standard seal available from Harbor Seal, Incorporated at 909 Myrtle Avenue, Monrovia, Calif. 91016. A second rotating seal 112 (similar to seal 105, and shown only schematically) makes a static seal against the drive shaft and makes a sliding seal against an annular seat (not shown) around central opening 49 of the upper end wall 46 of the housing 45.

The mixer 52 mounted under the housing preferably is of the type disclosed in my U.S. Pat. No. 4,657,401, which is incorporated herein by reference. In the present invention, a vertical bore 122 through the bottom 56 of the mixer forms an inlet for light liquid. A vertical bore 126 through the bottom 56 of the mixer forms an inlet for heavy liquid.

A third rotating seal 130 (similar to the first, and shown only schematically), makes a static seal around the lower section of the drive shaft and a sliding seal against an annular seal (not shown) disposed around the central opening 64 in the annular bottom of the mixing unit. A fourth sliding seal 132 makes a static seal around a vertical inlet tube 134 and a sliding seal on an annular seat (not shown) around the central opening 50 in the lower end wall of the housing. The third and fourth rotating seals are similar to the first seal 105, and are shown only schematically. The upper end of the inlet tube extends into a lower portion of the rotatable tank and is welded to the inner periphery of the annular lower wall 18 of the tank. The lower section of the drive shaft is welded to the inner periphery of a first annular ring 136 welded inside the upper end of the inlet tube. A second annular ring 140 is welded inside the lower end of the inlet tube, which terminates in the mixing unit just above annular horizontal bottom 56. The lower section of the drive shaft is welded to the inner periphery of the second annular ring 140. Radially extending impellers 142 are secured by bolts 144 to the underside of the second annular ring 140 so that heavy and light liquids entering the bottom of the mixture are agitated by the rotating mixer blades 142 to cause one of the liquids to be intimately dispersed in the other. For example, an organic liquid may be the light liquid, and the heavy liquid may be a water solution of a material to be recovered during the liquid-liquid extraction. In a typical operation for removing dissolved copper ions from water, about 10 volumes of organic liquid are used for each volume of water, and the water is dispersed throughout the organic liquid as discrete droplets in a discontinuous phase. The mixed liquids are driven by the rotating impellers through inlet openings 150 in the lower end of the inlet tube below lower end wall 48 of the housing 45. The mixed liquids flow out openings 152 in the upper end of the inlet tube above the lower end wall 18 of the rotatable tank.

Four vertical and radially extending impeller baffles 156 are mounted at equal intervals around the exterior of the drive shaft. Only two of the four vertical baffles are shown. The inner edge of each vertical baffle is welded in a separate respective vertical groove 158 formed in the exterior of the drive shaft. The inner portion of the lower edge of each vertical baffle rests on the upper end of the inlet tube. The outer edge of each vertical baffle terminates a short distance from the interior surface of the tank wall 16. The upper edge of each vertical baffle terminates in the tank just below an annular horizontal deflection baffle 160. The upper section of the drive shaft just above inlet ports 96 is welded to the inner periphery of the annular horizontal baffle 160.

Thus, mixed liquids entering the lower end of the rotating tank are subjected to centrifugal action by the vertical baffles, causing the heavy liquid to flow outwardly and concentrate the light liquid around the drive shaft. The light liquid flows into inlet ports 96 of the drive shaft and out outlet ports 98 into the collector 100 from which light liquid is removed by discharge pipe 102 for storage or further treatment.

Heavy liquid flows up through the annular space between the outer periphery of the annular horizontal baffle 160, and inwardly in the space between the horizontal baffle in the upper end wall of the tank. Heavy liquid flows upwardly out of the tank through vertical tank outlet ports 162 in the upper end wall of the tank, and into and down through the annular space between the housing side wall and the tank side wall. Heavy liquid leaves the housing through a vertical exit port 164 through the lower end wall 48 of the housing 45.

As shown in FIG. 2, the outlet ports 162 in the upper end wall of the tank are located on concentric circles disposed coaxially around the axis of tank rotation. As shown in FIG. 3, each outlet port 162 is internally threaded, and can be opened or closed by an externally threaded plug 168. Thus, depending on operating conditions, the annular zone of separation of the heavy and light liquids in the tank can be adjusted by opening or closing selected outlet ports 162. A removable cover 170 over a vertical opening 172 in the upper end wall 46 of the housing permits access to the upper ends of the outlet ports 162 to facilitate inserting or removing plugs 168 to achieve the desired location of the separation zone of heavy and light liquids in the tank.

A vent tube 180 extending through the upper end wall 46 of the housing vents the interior of the housing to the atmosphere.

A removable plug 182 in a vertical drain port 184 extending through the lower end wall 48 of the housing permits the housing to be drained for periodic cleaning.

The apparatus and method described above provides fast, efficient, and low-cost mixing and separation of liquids of different densities and which are substantially mutually insoluble. The mixing unit ensures intimate dispersion of one liquid within the other, and the centrifugal action of the separator rapidly separates the two liquids. Moreover, the use of the sturdy frame to carry the weight of the apparatus and the liquid undergoing treatment permits the rotatable tank to be constructed of relatively thin wall sheet metal, resulting in low material and manufacturing costs. For example, the cylindrical sidewall 16 of the rotatable tank can be rolled from relatively thin, say ⅜", sheet metal.

Any suitable material can be used to make those parts of the apparatus which contacts the liquids used in the process, but I prefer to use titanium or stainless steel.

I claim:

1. Apparatus for separating a mixture of two liquids of different densities and which are substantially insoluble in each other, the apparatus comprising:

a separator tank rotatable about an axis extending through the tank;

a tank inlet for the two mixed liquids;

a tank outlet substantially on the axis for the light liquids;

a plurality of tank outlets for the heavy liquid, the plurality of outlets for the heavy liquid being spaced different distances from the axis, the outlets for the liquids being axially spaced from the tank inlet; and a deflection baffle in the tank between the light liquid outlet and the outlets for the heavy liquid, the deflection baffle substantially lying in a plane transverse to the axis so the baffle has an outer edge spaced from the tank and located a greater distance from the axis than the outlets for the heavy liquid.

2. Apparatus according to claim 1 which includes impeller baffles in the tank, the impeller baffles extending radially outwardly from the axis of rotation, and extending longitudinally in the tank, the outer edge of each baffle being spaced from the tank.

3. Apparatus according to claim 1 in which at least some of the outlets for the heavy liquid lie on substantially concentric circles.

4. Apparatus according to claim 3, which includes plugs for closing and opening the outlets for the heavy liquid.

5. Apparatus according to claim 1 or 3 which includes a stationary housing disposed around and spaced from the rotatable tank, the housing having an opening to provide easy access to the outlets for the heavy liquid.

6. Apparatus according to claim 5 which includes a removable cover for the opening in the housing.

* * * * *